United States Patent [19]

Smith et al.

[11] 4,128,311

[45] Dec. 5, 1978

[54] HEATER CONTROL METHOD FOR LIQUID CRYSTAL DEVICES

[75] Inventors: George W. Smith; Michael Kaplit, both of Birmingham; Daniel B. Hayden, Port Huron, all of Mich.

[73] Assignee: General Motors Corporation, Detroit, Mich.

[21] Appl. No.: 820,640

[22] Filed: Aug. 1, 1977

[51] Int. Cl.² ............................................. G02F 1/13
[52] U.S. Cl. ..................... 350/331; 350/336
[58] Field of Search ................ 350/331, 332, 351, 336

[56] References Cited

U.S. PATENT DOCUMENTS

| 3,770,961 | 11/1973 | Westill | 350/331 X |
| 3,907,405 | 9/1975 | Fukai et al. | 350/331 X |
| 3,921,162 | 11/1975 | Fukai et al. | 350/331 X |
| 4,029,393 | 6/1977 | Dungan et al. | 350/331 X |
| 4,057,325 | 11/1977 | Kondo | 350/331 X |

Primary Examiner—Edward S. Bauer
Attorney, Agent, or Firm—Warren D. Hill

[57] ABSTRACT

A nematic liquid crystal display device exhibits dielectric anisotropy when the device is in a normal operating temperature range. By placing electrodes on either side of the layer of liquid crystal material and applying across the material an electric field insufficient to change the molecular orientation in the material, the capacitance and therefore the dielectric constant of the material is measured. A similar measurement of dielectric constant is made with a strong electric field applied across the material such that the molecules are re-oriented unless the device is so cold that the molecular change cannot occur and the device is inoperative as a display. By comparing the dielectric constants, it is determined whether the device is at a suitable operating temperature and a heater for the device is controlled accordingly.

3 Claims, 3 Drawing Figures

HEATER CONTROL METHOD FOR LIQUID CRYSTAL DEVICES

This invention relates to a method for controlling a heater for a liquid crystal display device and particularly to such a method based on sensing the dielectric anisotropy of the device.

Where nematic liquid crystal displays are used in environments having widely ranging temperatures such as in an automotive vehicle, it is necessary to heat the devices when low ambient temperatures occur in order to keep the liquid crystal material at an operative temperature. It has been proposed to provide heaters for the liquid crystal devices, however, control for operating such heaters has generally been based upon some parameter indirectly related to the liquid crystal function. For example, the ambient temperature may be measured and the temperature of the liquid crystal device surmised from that so the heater is energized when the ambient temperature is low. If however the device is heated locally, the ambient temperature does not accurately reflect the device temperatures. It is herein proposed to use a measure of the dielectric anisotropy of the liquid crystal material as the control parameter for energizing the heater.

It is therefore an object of this invention to provide a heater control method for a liquid crystal device wherein a measure of dielectric anistropy of the liquid crystal material is obtained and the heater is controlled accordingly.

It is a further object to carry out such a method by detecting differences in dielectric constant of the liquid crystal material when field strengths of different values are applied to the material and controlling the heater operation according to measure differences in dielectric constant.

The invention is carried out in a nematic liquid crystal device incorporating a heating element by providing capacitive elements in the liquid crystal device including the liquid crystal material as the capacitor dielectric, sensing the dielectric constants when weak electrical field is applied across the liquid crystal material and when a strong electric field is applied across the material, comparing the dielectric constants for those two conditions and energizing the heater when the difference in dielectric constants is below a predetermined value indicative of a temperature below a desired operating value.

The above and other advantages will be made more apparent from the following specification taken in conjunction with the accompanying drawings wherein like reference numerals refer to like parts and wherein.

Figure 1:
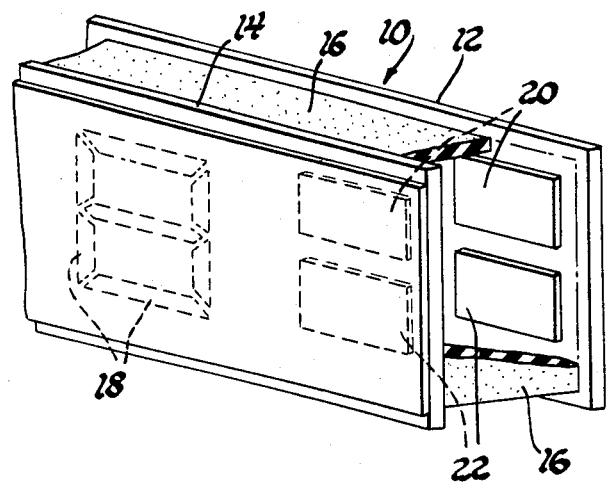
FIG. 1 is a schematic illustration of a liquid crystal device incorporating capacitive elements for measurement of the dielectric constant of the liquid material for practicing the method of the invention.

Referring to FIG. 1, a liquid crystal device 10, suitable for a display device, includes a pair of spaced glass plates 12 and 14. While in practice the spacing of the plates is quite small, say 10 to 12 microns, the spacing is exaggerated in the drawing for the sake of clarity. An insulating sealant and spacer 16 disposed between the plates around the periphery thereof contains the liquid crystal material, not shown, which fills the space between the plates. Electrodes 18 (shown in dotted lines) secured to one of the plates represent a seven segment digit display although any electrode pattern may be used depending upon the desired display symbol. Two pairs of opposed capacitor electrodes 20, 22 are carried on the inner walls of the plates 12 and 14 to form two capacitors with the liquid crystal material as dielectric. The liquid crystal material is of the nematic type which at normal operating temperatures and at low frequencies of applied electrical field exhibits dielectric anisotropy. That is the dielectric constant of the liquid crystal material measured in a direction parallel to the preferred direction of molecules is different from the dielectric constant measured perpendicular to that direction. In the presence of no electric field or a weak field, the molecules align themselves parallel to the plates 12 and 14. Thus, weak electric field between the capacitor electrodes 20 or 22 is perpendicular to the direction of the molecules. When however a field strong enough to alter the preferred direction of the molecules is applied across the layer of liquid crystal material, the molecules align themselves parallel to the field so that the dielectric constant is different from that measured in the presence of the weak electric field. When the liquid crystal device is at such a low temperature that the liquid crystal freezes or become a rigid glass, the liquid crystal molecules are unable to re-orient in the presence of an electric field. So that the dielectric constant does not change in response to a strong electric field.

Figure 2:
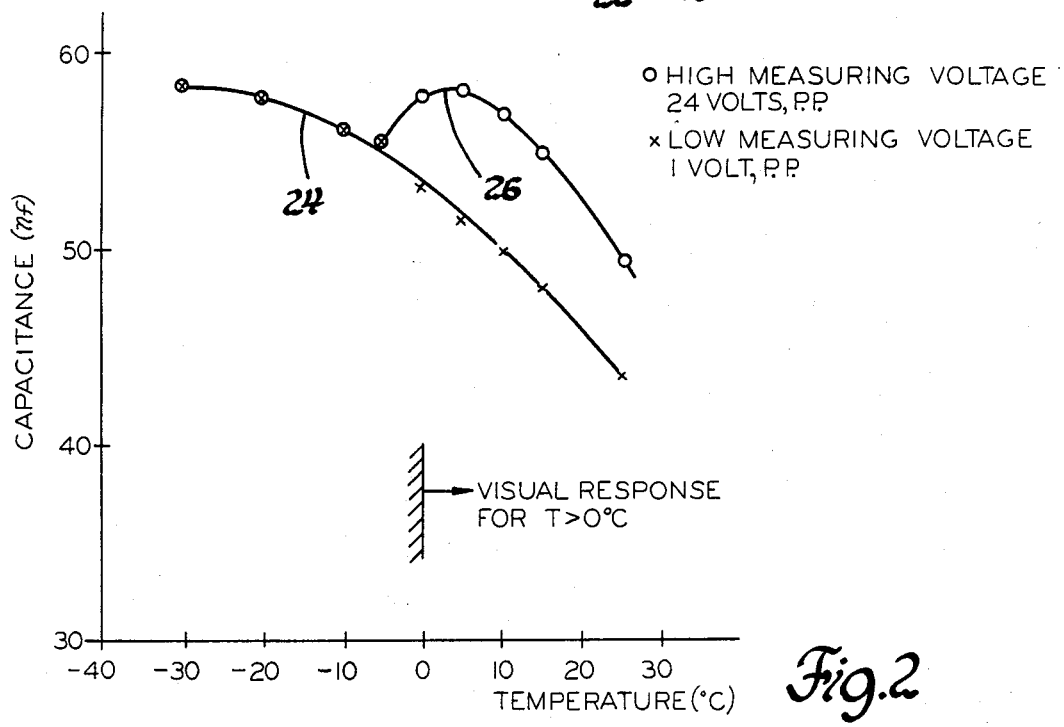
FIG. 2 is a graph illustrating the change of dielectric constant of liquid crystal material with temperature for weak and strong applied electric fields.

The graph of FIG. 2 illustrates the change of capacitance with temperature of a liquid crystal device. Where the capacitor spacing is of the order of 10 microns then the threshold field strength necessary to re-orient the molecule direction is established by an applied voltage of only 4 or 5 volts. In FIG. 2, the curve 24 represents the capacitance obtained using Kodak 11900 liquid crystal material with an applied voltage of 1600 hertz and one volt peak-to-peak. The capacitance exhibits a steady decline with increasing temperature probably due to thermal effects on the dimensions of the liquid crystal device. At an applied voltage of 24 volts peak-to-peak, the capacitance remains the same as that for curve 24 for low temperatures. However at $-5°$ C a departure occurs and as shown by curve 26 a higher capacitance is evidenced for the strong electric field. Visual observation of the liquid crystal display device under test revealed that no significant optical response of the display was readily discernible at temperatures below zero degrees. But for higher temperatures, optical changes occurred upon voltage application to segments of control electrodes in the display. Thus for the particular device under test, dielectric anisotropy occurred at temperatures above $-5°$ C and the value of dielectric anisotropy became sufficiently large at $0°$ C to provide satisfactory operation of the display device. The control method described herein then is based on sensing the difference in dielectric constants for weak and strong fields applied across the liquid crystal material and controlling the operation of the heater in dependance on the magnitude of the difference in the dielectric constants. Thus in effect the control method would cause energization of the heater for small or zero differences in dielectric constants and maintain operation of the heater until the dielectric constants obtain a difference sufficient to enable operability of the display corresponding in FIG. 2 to that differences which occurs at 0° C.

Figure 3:
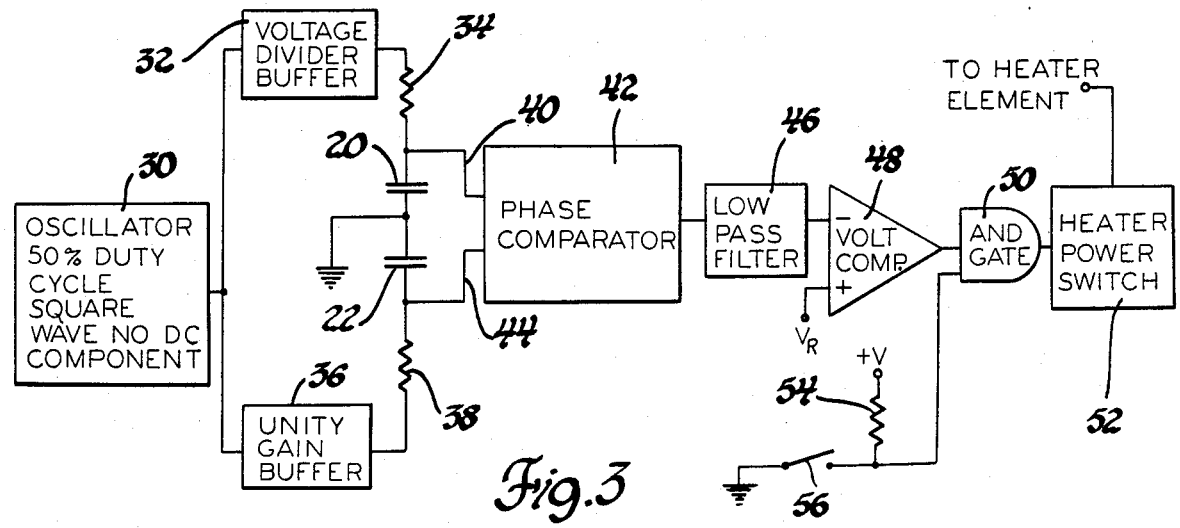
FIG. 3 is a block diagram of a control circuit for the heater of the liquid crystal device of FIG. 1 to carry out the method of the invention.

The block diagram of FIG. 3 reveals the circuit arrangement which carries out the method of the invention. An oscillator 30 having a fifty percent duty cycle square wave output signal with no DC component has its output connected serially through a voltage divider buffer amplifier 32, a reference resistor 34 and capacitor 20 (of the device of FIG. 1) to ground. The output of the oscillator 30 is further connected serially through a unity gain buffer amplifier 36, a reference resistor 38 equal in value to the resistance 34 and the capacitor 22 to ground.

The juncture of the resistor 34 and capacitor 20 is connected by line 40 to one input of a phase comparator 42, while the junction of the resistor 38 and capacitor 22 is connected by line 44 to another input terminal of the phase comparator 42. The output of the phase comparator 42 comprises pulses of width proportional to the phase difference of the input signals. That output is fed through a low pass filter 46 which smooths the pulses to a DC signal which is fed to the negative input terminal of a voltage comparator 48. The positive input terminal of the voltage comparator is connected to a reference voltage $V_R$. The voltage comparator output is connected to the input of an AND gate 50, the output of which is connected to a heater power switch 52 which selectively energizes the heater element of the liquid crystal device 10.

The second input of the AND gate 50 is connected through a resistor 54 to a positive voltage and through a thermostat switch 56 to ground, such that the AND gate is enabled whenever the switch 56 is opened to allow operation of the heater power switch, and the AND gate is disabled when the thermostat switch 56 is closed thereby preventing heater element energization. Thus the thermostat switch is arranged to be open at low temperatures below 20° C and closed for higher temperatures to provide a safety feature for prevention of overheating of the liquid crystal device.

In operation the voltage applied to the capacitor 20 through the buffer amplifier 32 and resistor 34 is sufficiently small that a weak electric field (much less than 5,000 v/cm) is imposed across the liquid crystal material of the capacitor 20, the field being too weak to cause a molecular realignment of the liquid crystal material. On the other hand, the voltage supplied to the capacitor 22 through the buffer amplifier 36 and the resistor 38 is sufficiently large to provide a strong electric field (at least 5,000 v/cm) across the liquid crystal material of the capacitor 22, the field being strong enough to re-orient the molecular direction when the field is applied provided that the temperature of the device is sufficiently high to permit the molecular realignment. Assuming the device 10 is at a very low temperature so that the liquid crystal material is not responsive to the application of the strong electric field, the capacitances of the capacitors 20 and 22 will be equal and the voltage signals on lines 40 and 44 will be in phase. Thus the filtered output of the phase comparator will be low compared to the value of the voltage reference signal $V_R$ applied to the voltage comparator 48, and a positive output of the voltage comparator will be gated through to the heater power switch 52 (assuming that the thermostat switch 56 is open) so that the heater element is energized. As the liquid crystal material becomes warm and consequently becomes responsive to the alignment action of the strong electric field across the capacitor 22, the capacitance of the capacitor 22 increases as shown by the curve 26 of FIG. 2. Then the phase angle of the signal on line 44 becomes different from that on line 40 so that the phase comparator output when filtered increases to a level eventually reaching the value of the voltage reference level $V_R$. When that occurs the output of the voltage comparator 48 becomes small to disable the AND gate 50 and turn off the heater power switch thereby de-energizing the heater element on the liquid crystal device 10.

It will thus be seen that according to this embodiment of the method the two capacitors are simultaneously applied with voltages to establish respective weak and strong electrical fields across the liquid crystal material and to monitor the effect of those fields on the capacitance and more particularly the difference in capacitance of the two capacitors. Further, the difference in capacitances is reflected in a parameter of the output signals fed to the phase comparator, that is the relative phase of the two signals is dependent upon the response of the liquid crystal material to the strong electric field, the response having a significant value only when the liquid crystal device is at a normal operating temperature which is suitable for the optical switching necessary for liquid crystal display operation.

Of course, the method may be carried out by different types of apparatus. For example, the capacitance measurement may be made simultaneously or sequentially with two capacitors or one, and the comparison may be carried out by analog or digital techniques.

The embodiments of the invention in which an exclusive property or privilege is claimed are defined as follows:

1. The method of controlling a heater for a liquid crystal device containing a layer of liquid crystal material of the type having at a given operating temperature one dielectric constant when a weak electric field insufficient to alter the molecular orientation is applied thereacross and another dielectric constant when a strong electric field effective to alter the molecular orientation is applied, and below operating temperature having a dielectric constant substantially unchanging with changes in field strength; comprising the steps of
    applying across the liquid crystal material layer the said weak electric field and sensing the dielectric constant to botain a first electrical signal having a parameter dependent on the dielectric constant,
    applying across the liquid crystal material layer the said strong electric field and sensing the dielectric constant to obtain a second electrical signal having a parameter dependent on the dielectric constant,
    comparing the first and second electrical signals to produce a control signal effective to turn on the heater for the liquid crystal device, if it is off, when the said parameters of the said signals are substantially equal indicating that the dielectric constant is nonresponsive to the difference in applied fields, and to produce a control signal effective to turn off the heater for the liquid crystal device, if it is on, when the said parameters of the said signals differ by a predetermined value indicating that the dielectric constant is changeable in response to the difference in applied fields.

2. The method of controlling a heater for a liquid crystal device containing a layer of liquid crystal material of the type having at a given operating temperature one dielectric constant when a weak electric field insufficient to alter the molecular orientation is applied thereacross and another dielectric constant when a strong electric field effective to alter the molecular orientation is applied, and at a temperature below operating temperature having a dielectric constant substantially unchanging with changes in field strength; comprising the steps of applying across a first reference impedance and the liquid crystal material layer an AC current at low voltage to effect the said weak electric field and sensing the resultant voltage signal across the said layer to obtain a first voltage signal having a phase dependent on the dielectric constant, applying across a second reference impedance and the liquid crystal material layer an AC current at high voltage to effect the said strong electric field and sensing the resultant voltage signal across the said layer to obtain a second voltage signal having a phase dependent on the dielectridc constant, comparing the phases of the first and second voltage signals to produce a control signal effective to turn on the heater for the liquid crystal device, if it is off, when the said phases of the said signals are substantially equal indicating that the dielectric constant is nonresponsive to the difference in applied fields, and to produce a control signal effective to turn off the heater for the liquid crystal device, if it is on, when the said phases of the said signals differ by a predetermined amount indicating that the dielectric constant is changeable in response to the difference in applied fields.

3. The method of controlling a heater for a liquid crystal device containing a layer of liquid crystal material of the type having at a given operating temperature one dielectric constant when a weak electric field insufficient to alter the molecular orientation is applied thereacross and another dielectric constant when a strong electric field effective to alter the molecular orientation is applied, and at a temperature below operating temperature having a dielectric constant substantially unchanging with changes in field strength; comprising the steps of providing two pairs of electrodes on opposite sides of the ayer of liquid crystal material to define first and second capacitors, simultaneously applying said weak and strong electric fields across the first and second capacitors respectively and obtaining first and second signals each having a parameter dependent on the dielectric constant of the respective capacitor, comparing the first and second electrical signals to produce a control signal effective to turn on the heater for the liquid crystal device, if it is off, when the difference of the said parameters is less than a predetermined value indicating that the dielectric constant is substantially nonresponsive to the difference in applied fields, and to produce a control signal effective to turn off the heater for the liquid crystal device, if it is on, when the said parameters of the said signals differ by at least the said predetermined value indicating that the dielectric constant is substantially changeable in response to the difference in applied fields.

* * * * *

UNITED STATES PATENT AND TRADEMARK OFFICE
CERTIFICATE OF CORRECTION

PATENT NO. : 4,128,311

DATED : December 5, 1978

INVENTOR(S) : George W. Smith et al

It is certified that error appears in the above-identified patent and that said Letters Patent are hereby corrected as shown below:

Column 4, claim 1, line 46, "botain" should read -- obtain --.

Column 5, claim 2, line 18, "dielectridc" should read -- dielectric --.

Column 6, claim 3, line 11, "ayer" should read -- layer --.

Signed and Sealed this

Third Day of April 1979

[SEAL]

Attest:

RUTH C. MASON
*Attesting Officer*

DONALD W. BANNER
*Commissioner of Patents and Trademarks*